United States Patent [19]

Gray et al.

[11] Patent Number: 5,822,751
[45] Date of Patent: Oct. 13, 1998

[54] EFFICIENT MULTIDIMENSIONAL DATA AGGREGATION OPERATOR IMPLEMENTATION

[75] Inventors: Jim Gray, San Francisco, Calif.; Donald C. Reichart, Redmond, Wash.

[73] Assignee: Microsoft Corporation, Redmond, Wash.

[21] Appl. No.: 768,105

[22] Filed: Dec. 16, 1996

[51] Int. Cl.$^6$ .................................................... G06F 17/30
[52] U.S. Cl. .......................... 707/3; 701/4; 701/2; 701/5; 707/526
[58] Field of Search ........................ 707/526, 4, 2, 707/523, 101, 8, 1, 104, 103, 3, 5, 100; 1/1

[56] References Cited

U.S. PATENT DOCUMENTS

| | | | |
|---|---|---|---|
| 5,359,724 | 10/1994 | Earle | 707/205 |
| 5,412,804 | 5/1995 | Krishna | 707/2 |
| 5,511,190 | 4/1996 | Sharma et al. | 707/1 |
| 5,598,559 | 1/1997 | Chaudhuri | 707/2 |
| 5,713,020 | 1/1998 | Reiter et al. | 1/1 |

FOREIGN PATENT DOCUMENTS

372185 A2  6/1990  European Pat. Off. ........ G06F 12/02

OTHER PUBLICATIONS

Jim Gray et al., Data Cube: A Relational Aggregation Operator Generalizing Group-By, Cross-Tab and Sub-Totals, Microsoft Research Advanced Technology Division, Microsoft Corporation, Technical Report: MSR-TR-95-22, 5, Feb. 1995, Revised 17 Jul. 1995.

J. Gray, A. Bosworth, A. Layman, H. Pirahesh, "DataCube: A Relational Aggregation Operator Generalizing Group-By, Cross-Tab, and Sub-Totals" Proc. International Conf. On Data Engineering, IEEE Press, Feb. 1996, New Orleans.

C. J. Date, "Aggregate Functions," Database Programming and Design, vol. 9 No. 4, Apr. 1996, pp. 17-19.

V. Harinarayn, A. Rajaraman, J. Ullman, "Implementing Data Cubes Efficiently," Proc. ACM SIGMOD, Jun. 1996, Montreal, pp. 205-216.

*Primary Examiner*—Thomas G. Black
*Assistant Examiner*—Srirama Channavajjala
*Attorney, Agent, or Firm*—Duft, Graziano & Forest, PC

[57] ABSTRACT

An efficient implementation of a multidimensional data aggregation operator that generates all aggregates and super-aggregates for all available values in a results set by first generating a minimal number of aggregates at the lowest possible system level using a minimal number of function calls, and second categorizing the aggregate function being applied and applying the aggregate function with the fewest possible function calls. The aggregates are generated from a union of roll-ups of the n attributes to the GROUP BY clause of the SELECT statement. The number of roll-ups are minimized by including a barrel shift of the attributes being rolled up. A scoreboard array of $2^n$ bits is updated during the roll-up and barrel shifting process to keep track of which roll-ups are complete and with are not yet complete. Generating super-aggregates is further optimized by identifying the type of aggregate function being applied and facilitating the most efficient application of the aggregate function. A lter_super() function is implemented to facilitate the most efficient application of algebraic aggregate functions that require access to intermediate aggregate data that heretofore was not available to any algebraic aggregation operator.

14 Claims, 6 Drawing Sheets

EFFICIENT MULTIDIMENSIONAL DATA AGGREGATION OPERATOR IMPLEMENTATION

FIELD OF THE INVENTION

The present invention relates to the field of database data aggregation operators, and more particularly to an efficient implementation of a multidimensional generalization of the data aggregation operators.

PROBLEM

Data analysis applications aggregate data across different dimensions of a data set to look for anomalies or unusual patterns in the data set. However, existing Structured Query Language (SQL) aggregate functions and operators, such as the GROUP BY operator have limited usefulness because they produced only zero-dimensional or one-dimensional aggregates. To accommodate maximum data aggregation, an N-dimensional generalization of the existing aggregation operators was created called the CUBE operator. The term CUBE operator is used throughout this document to refer generally to any SQL operator designed as an n-dimensional generalization of at least one existing SQL aggregation operator. The term data cube is used throughout this document to refer generally to any n-dimensional results set generated by a CUBE operator.

The CUBE operator is a switch in the GROUP BY clause of the SELECT statement. The CUBE operator generalizes the histogram, cross-tabulation, roll-up drill-down, and sub-total aggregation constructs of existing data analysis applications to generate aggregates and super-aggregates for all elements within the GROUP BY clause. Because the CUBE operator generates a multi-dimensional data result set called a data cube instead of the typical zero-dimensional or one-dimensional data results set, and because the data cube is relational, the CUBE operator can be imbedded in complex non-procedural data analysis programs.

The CUBE operator is used with an aggregate function to generate additional rows in a results set. Columns, also known as elements, that are specified in a GROUP BY clause are cross-referenced to produce a superset of groups. The aggregate function specified with the CUBE operator is applied to these groups to produce summary values for the additional super-aggregate rows that are added to the results set. The number of extra groups in the results set is determined by the number of elements in the GROUP BY clause. The aggregate function is applied to the cross-referenced elements to generate the super-aggregates. Every possible combination of the elements in the GROUP BY clause is used to generate the super-aggregates. Thus, if there are n elements in the GROUP BY clause, then there are $2^n-1$ possible super-aggregate combinations added to the results set. Mathematically, the super-aggregate combinations form an n-dimensional cube, which is how the operator got its name. Examples of aggregate functions that can be used with a CUBE operator include, but are not limited to, AVE, SUM, MAX, MIN, and COUNT.

Applying the CUBE operator to a company sales management report, for example, that records sales personnel, customers, products, and quantities sold of each produce, a SELECT statement used with the COUNT aggregate function produces a result set of how many of each product were sold, to which customers, and by which sales person. By then applying the CUBE operator, the result set is expanded to include a cross-reference of products that particular customers frequently purchase, which sales personnel sell the most of a particular product, and which products are the most popular overall. By using a visualization application or other analysis tool, the data cube results set can be fed into charts and graphs that convey results and relationships that are easily interpreted by the end user.

However, one significant problem persists with existing methods for generating a data cube is that existing CUBE operator implementations consume too much time and processing resources to an extent that adversely impacts end user response time to visualizing the results of a query. Existing methods for generating aggregates in a given dimension include performing a straight forward aggregation operation on each set of elements in each dimension regardless of repeating aggregations. Existing methods for generating super-aggregates in a given dimension or across dimensions include a straight forward aggregation operation on each set of aggregates in each dimension regardless of repeating aggregations. Thus, the time and processing resources required to generate the data cube must be minimized to maintain acceptable end user response times.

SUMMARY

The present invention solves the above stated problem by an efficient implementation of a multidimensional data aggregation operator that generates all aggregates and super-aggregates for all available values in a results set. Efficiently implementing a multidimensional data aggregation operator that generates all aggregates and super-aggregates for all available values in a results set is accomplished by first generating a minimal number of aggregates at the lowest possible system level. For an n-dimensional data cube there are n! possible roll-up strings, however, the minimal number of aggregates for an n-dimensional data cube requires only a series of Binomial(n,n/2) roll-ups. The aggregates are generated from a union of roll-ups of the attributes to the GROUP BY clause of the SELECT statement. To minimize the number of roll-ups required, a barrel shifting scheme is used to generate only the specific additional ones of the roll-up aggregates required for a complete set of aggregates. A scoreboard array of $2^n$ bits is updated during the roll-up and barrel shifting process to keep track of which roll-ups are complete and which are not yet complete.

Generating super-aggregates is further optimized by identifying the type of aggregate function being applied and facilitating the most efficient application of the aggregate function. In one preferred embodiment the types of aggregate functions are categorized as either distributive, algebraic, or holistic. A new Iter_super() function is implemented to facilitate the most efficient application of algebraic aggregate functions that require access to intermediate aggregate data that heretofore was not available to any algebraic aggregation operator. The Iter_super() function has additional application in situations where parallel database processing is involved and/or where a data cube requires partitioning because the entire data cube will not fit concurrently into memory for processing.

Figure 1:
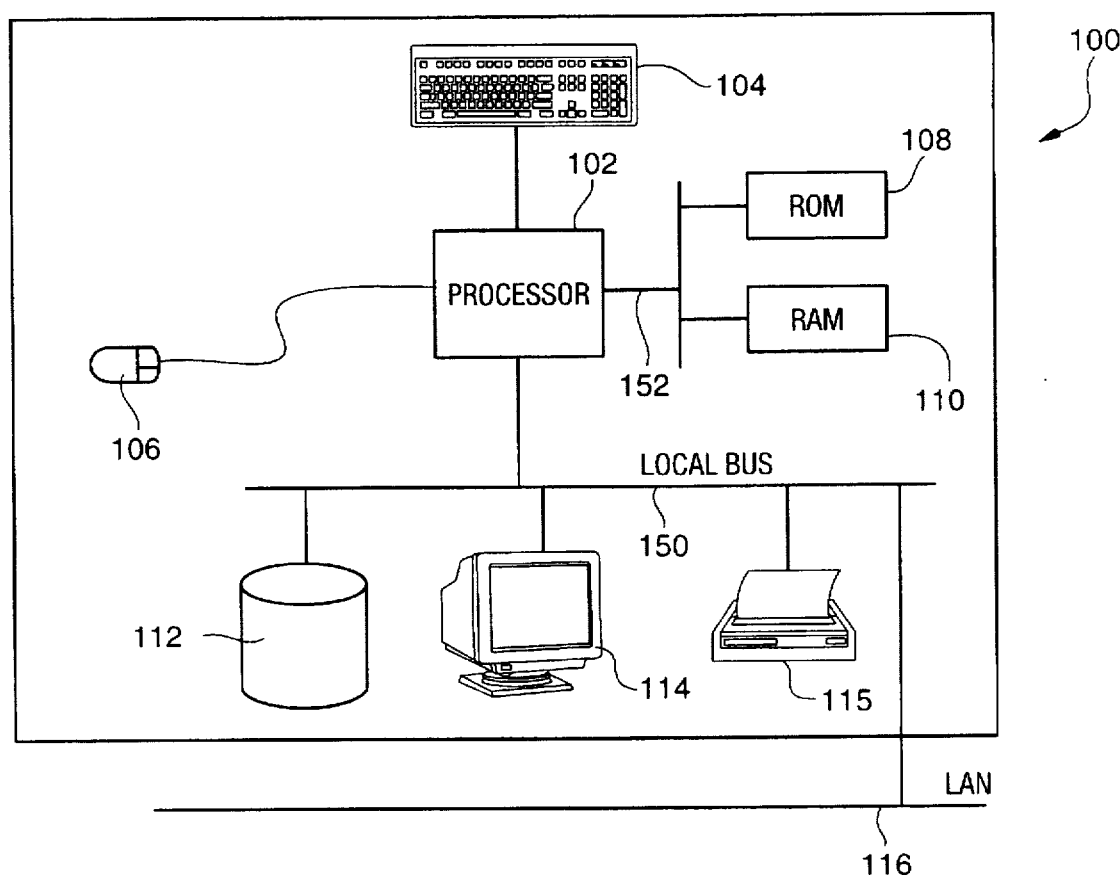
FIG. 1 illustrates a computing environment for use with the efficient multidimensional data aggregation operator implementation in block diagram form.

DETAILED DESCRIPTION
Computing Environment—FIG. 1

FIG. 1 illustrates a block diagram example of a computer system 100 for use with the efficient multidimensional data aggregation operator implementation. The efficient operator implementation of the present invention is operable in any database system supporting a multidimensional data aggregation operator on any of several standard computing systems readily available in the industry such as computer system 100. The efficient implementation and the host database are executable on processor 102. Processor 102 stores and/or retrieves programmed instructions and/or data from memory devices that include, but are not limited to, Random Access Memory (RAM) 110 and Read Only Memory (ROM) 108 by way of memory bus 152. Another accessible memory device includes non-volatile memory device 112 by way of local bus 150. User input to computer system 100 is entered by way of keyboard 104 and/or pointing device 106. Human readable output from computer system 100 is viewed on display 114 or in printed form on local printer 115. Alternatively, computer system 100 is accessible by remote users for debugging, input, and/or generating human readable displays in printed and/or display screen output form or any other output form by way of Local Area Network (LAN) 116.

Figure 2:
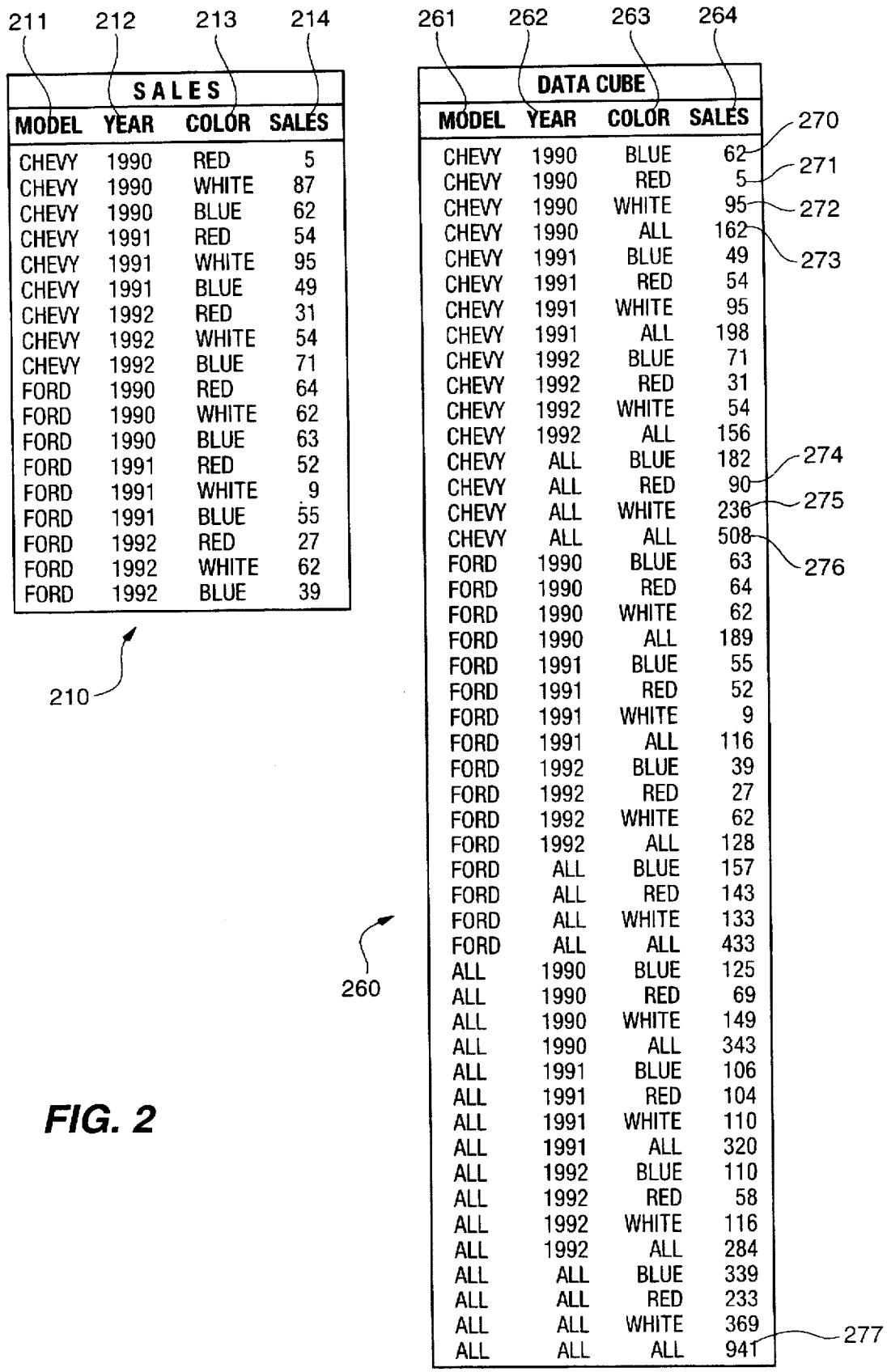
FIG. 2 illustrates a results set in standard and data cube form.

Data Cube Background—FIG. 2

FIG. 2 illustrates a simple example of an aggregate results set 210 from a database 200. FIG. 2 also illustrates the aggregate results set 210 in the form of a full data cube 260. It is useful to compare the aggregate results set 210 to the data cube 260 to illustrate the difference in the amount of aggregate data and to appreciate the magnitude of additional processing required to generate the complete set of aggregates in data cube 260.

The following discussion and illustration is based on an automobile sales database example that contains the model, year, and color for every car sold. A user wishing to view the sales totals for specific models of cars by year and by color might construct a query such as the following:

SELECT Model, Year, Color, SUM(sales) AS Sales
FROM Sales
WHERE Model in ('Ford', 'Chevy')
AND Year BETWEEN 1990 AND 1992
GROUP BY Model, Year, Color;

Executing the above query generates a results set similar to results set 210 that contains a column 211–213 corresponding to each of the Model, Year, and Color attributes of the SELECT statement, in addition to an aggregate Sales column 214 containing a corresponding sales total by Color and by Year and by Model. However, the results set 210 displays only a few of the available aggregate relationships that a CUBE operator can extract.

A data cube 260 can be generated from the core of the results set 210. Generating data cube 260 requires the set of all subsets of the Sales aggregation column 214. The set of all subsets is also known as the power set. Because the CUBE operator is itself an aggregation operation, a GROUP BY clause in a SELECT statement can be overloaded in a manner such as the CUBE query syntax below:

SELECT Mode, Year, Color, SUM(sales) AS Sales
FROM Sales
WHERE Model in ('Ford', 'Chevy')
AND Year BETWEEN 1990 AND 1992
GROUP BY CUBE Model, Year, Color;

Executing the above query generates a results set similar to data cube 260 that contains a column 261–263 corresponding to each of the Model, Year, and Color attributes of the SELECT statement. In addition, the CUBE operator aggregates over all possible combinations of attributes of the GROUP BY clause to generate a Sales column 264 containing the corresponding sales total of each Model by Year and by Color similar to the aggregate Sales column 214 of results set 210. The CUBE operator then sums each aggregate while substituting the ALL value in the appropriate aggregation columns. Thus, if there are n attributes in the GROUP BY clause, there will be $2^n-1$ super-aggregate values generated. Further, if the cardinality of the n attributes are $C_1, C_2, \ldots, C_n$ then the cardinality of the resulting data cube relation is $\Pi(C_i+1)$. The extra value in each domain is the ALL value. For example, the results set 210 contains 2×3×3=18 rows and the data cube 260 derived from applying the CUBE operator to the results set 210 generates 3×4×4=48 rows.

Note for example that data cube 260 contains totals in the Sales column 264 for blue, red, and white 1990 Chevy's in rows 270–272. In addition, there is a grand total row 273, for example, for all colors of 1990 Chevy's. Other aggregate relationships in data cube include, but are not limited to, super-aggregate totals for all years of a given Model and Color as in rows 274–276, and a super-superaggregate total row 277 for ALL Models in ALL Years in ALL Colors. Because even in this simple illustration the size of data cube 260 is more than twice the size of the original results set 210, it is important that the CUBE operator be implemented in an efficient manner to maximize processing time and processing resources by minimizing the number and type of function calls that are required to generate then data cube aggregates.

Figure 3:
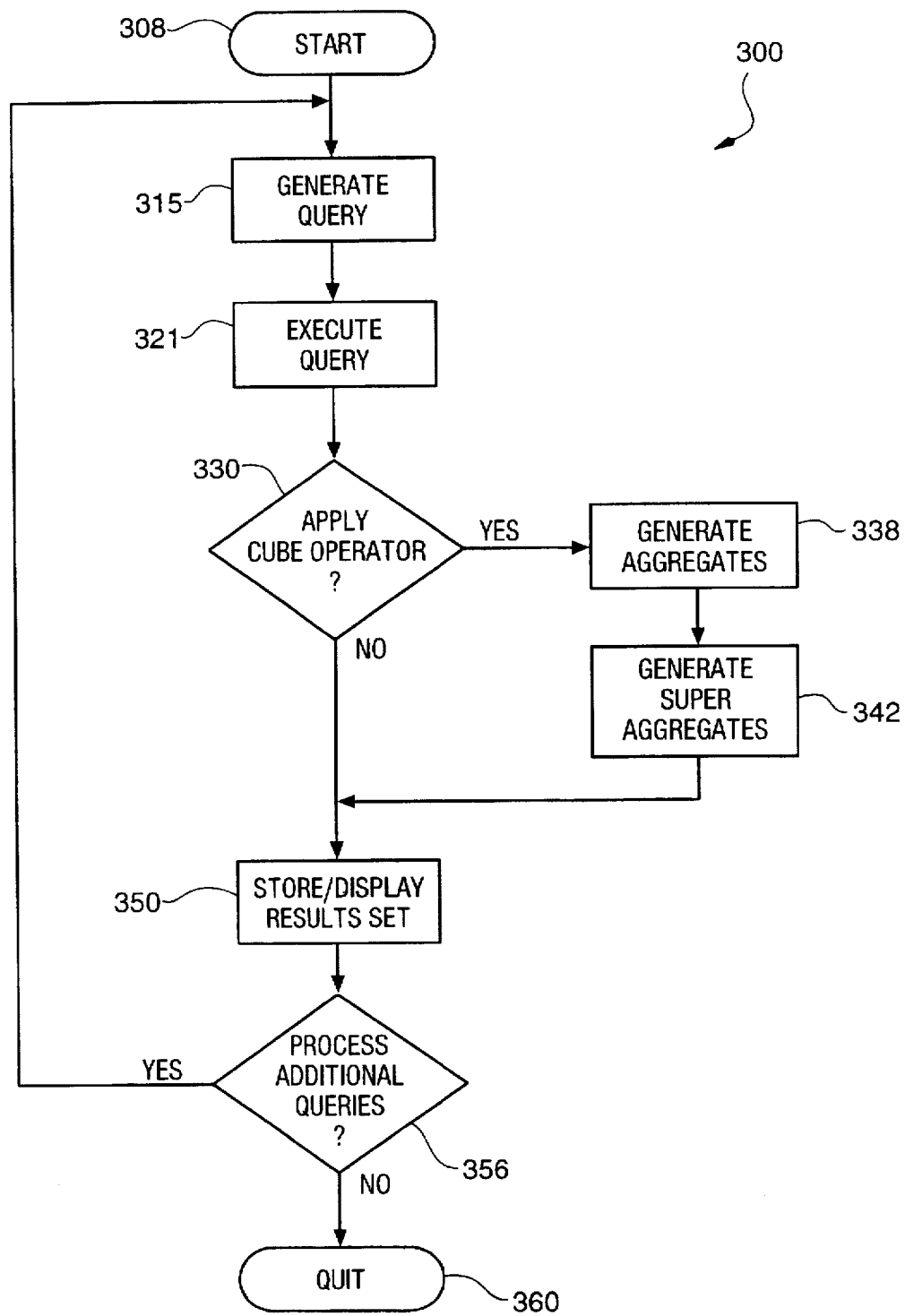
FIG. 3 illustrates an overview of the efficient implementation processing steps in flow diagram form.

Data Cube Generating Overview—FIG. 3

FIG. 3 illustrates an overview of the efficient implementation data cube generating steps 300 in flow diagram form. The method begins at step 308 and proceeds to generating a query for a target database at step 315 and executing the query at step 321 to extract a results set from the database. If it is determined at decision step 330 that the CUBE operator or its equivalent was specified in the executed query of step 321, then the CUBE operator is applied in steps 338 and 342. Alternatively, if it is determined at decision step 330 that the CUBE operator was not specified in the executed query of step 321, then processing continues at step 350 without applying the CUBE operator.

The two steps 338 and 342 that apply the CUBE operator to the results set from step 321 are central to the efficient multidimensional data aggregation operator implementation of the present invention. At step 338, the basic cumulative aggregates of the results set are generated as a union of a minimum number of roll-up's. Details of the roll-up operational steps are disclosed in the text accompanying FIGS. 4 and 5. At step 342, the super-aggregates are efficiently generated by classifying the type of aggregate function being applied and facilitating an efficient implementation of that aggregate function. Details of the super-aggregate generating steps are disclosed in the text accompanying FIG. 6.

Whether or not the CUBE operator is applied, processing continues at step 350 where the results set is displayed and/or stored as specified by the end user. If it is determined at decision step 356 that additional queries will be processed, then processing continues at step 315 as previously disclosed. If it is determined at decision step 356 that no additional queries will be processed, then processing stops at step 360.

Figure 4:
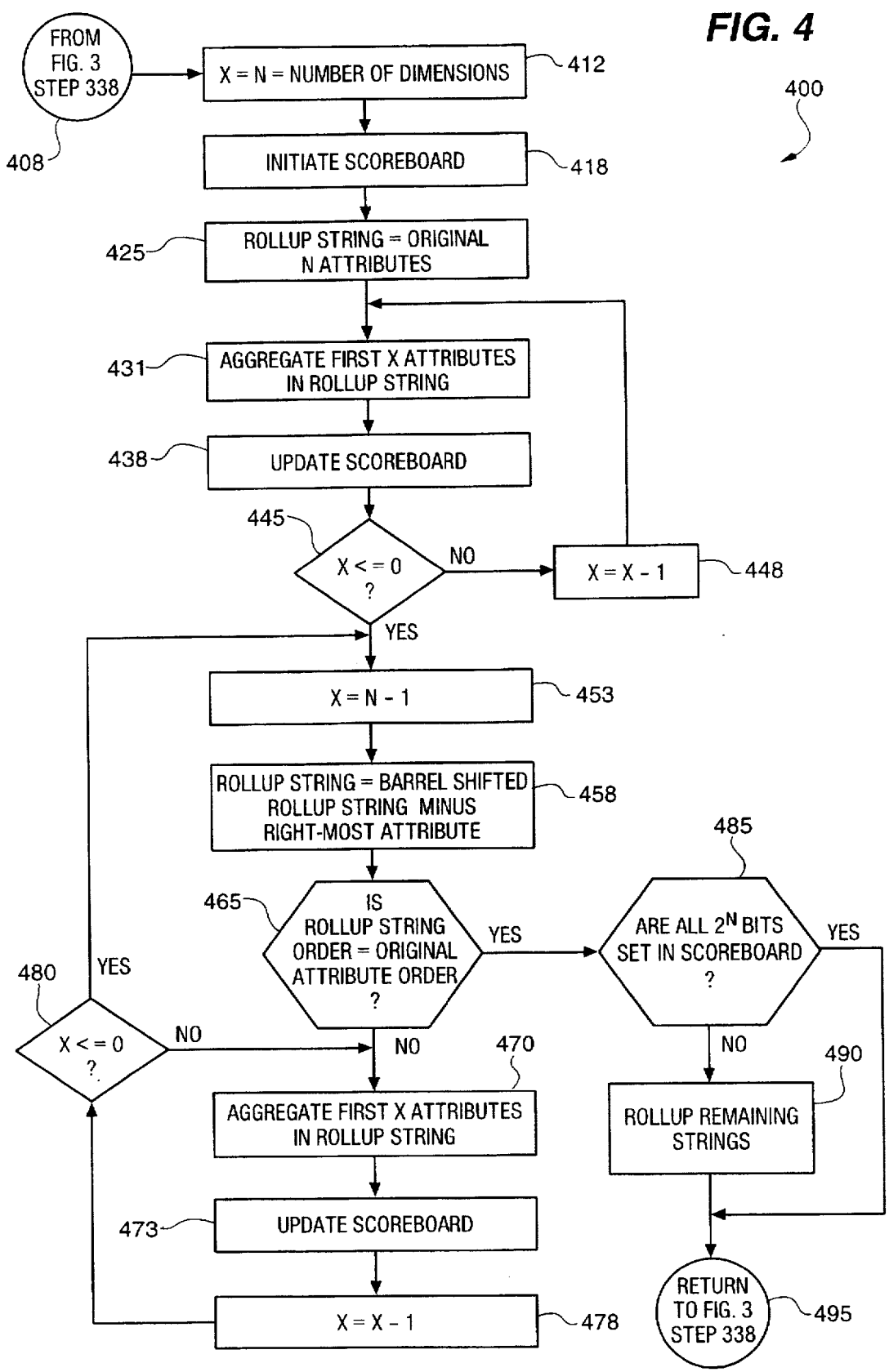
FIG. 4 illustrates details of the aggregate generating steps in flow diagram form.
Figure 5:
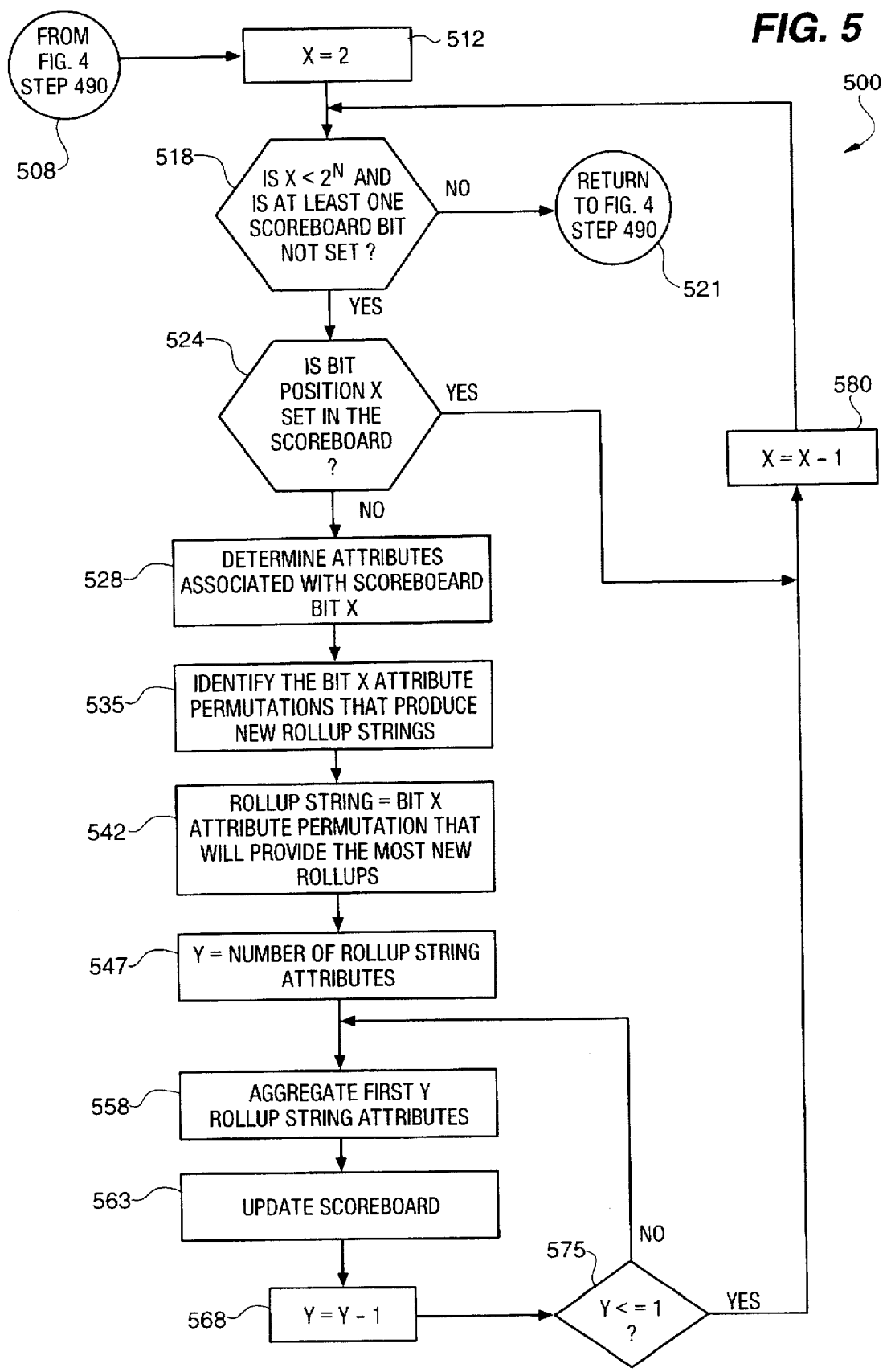
FIG. 5 illustrates details of the remaining aggregate cleanup steps in flow diagram form.
Figure 6:
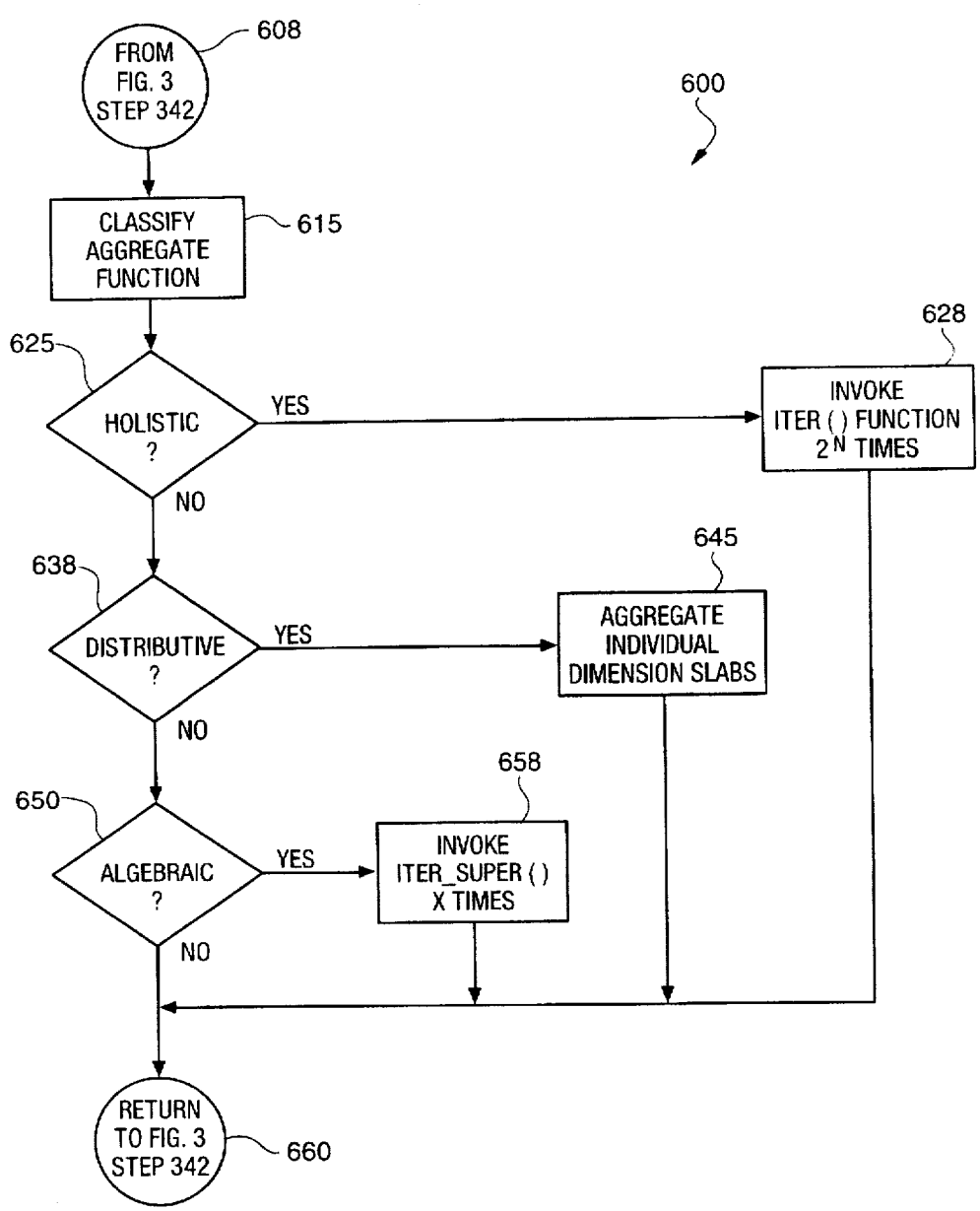
FIG. 6 illustrates details of the super-aggregate generating steps in flow diagram form.

Efficiently Generating Data Cube—FIGS. 4–6

FIG. 4 illustrates the primary roll-up operational steps 400 that form the first phase of efficiently generating a data cube. The roll-up operational steps 400 are the details of step 338 in FIG. 3.

The roll-up operational steps 400 begin at step 408 and proceed to step 412 where variables x and n are set to the number of dimensions of the data cube. The number of dimensions of a data cube equals the number of attributes in the SELECT statement. At step 418 the scoreboard is initialized. The scoreboard is an array of $2^n$ bits where n is the number of attributes of the select statement that are being rolled up. In a preferred embodiment the scoreboard is initially set to all zeros.

At step 425, the roll-up process is initialized by setting a roll-up string to the original n attributes. The ROLL-UP operator is used because it is an aggregate operator that delivers cumulative aggregates for attributes within a GROUP BY clause. A roll-up is the process of aggregating successive subsets of a string to generate an aggregate of each subset. The successive subsets are typically aggregated individually from right to left, and each subset contains one less rightmost attribute than the previous subset. At step 431, the first x attributes in the roll-up string are aggregated. At step 438, the scoreboard is updated by setting a bit in the array that corresponds to the roll-up string.

If at decision step 445 it is determined that x is not less than or equal to 0, then processing continues at step 448 where x is decremented by 1 and the roll-up and scoreboard steps 431 and 438 repeat as previously disclosed. Alternatively, if at decision step 445 it is determined that x is equal to or less than 0, then processing continues at step 453.

At step 453, scratch variable x is reset to equal one less than the original number of n attributes in preparation for a barrel shifted roll-up of additional roll-up strings. At step 458, the roll-up string is set to a barrel shifted roll-up string minus the rightmost attribute. In a preferred embodiment, barrel shifting is the process of left shift rotating the original n attributes by one attribute position so that the previous leftmost attribute is now in a hidden rightmost attribute position. The barrel shift method will identify an additional (n−1)2 roll-ups.

If at decision step 465, it is determined that the present roll-up string attribute order is not equal to the original order of n attributes, then processing continues at step 470. At step 470, the first x attributes of the present roll-up string are aggregated, and the corresponding bit in the scoreboard is set at step 473. At step 478, the scratch variable x is decremented by 1. If at decision step 480, it is determined that x is greater than 0, then processing continues at step 470 as previously disclosed to complete the roll-up on the present roll-up string. Alternatively, if at decision step 480 it is determined that x is equal to or less than 0, then processing continues at step 453 as previously disclosed to set up processing for a roll-up on the next barrel shifted roll-up string.

If at decision step 465, it is determined that the present roll-up string order is equal to the order of the original n attributes, then processing continues at decision step 485. If at decision step 485, it is determined that all $2^n$ bits are not set in the scoreboard array, then processing continues to step 490 where the remaining unaggregated strings are identified and rolled up. Step 490 has particular significance where n>3 because the ordinary roll-up operational steps 400 will not aggregate all available subset strings from the original n attributes. Details of step 490 are disclosed in the text accompanying FIG. 5. At the completion of step 490, processing continues at step 495. Alternatively, if at decision step 485 it is determined that all $2^n$ bits of the scoreboard are set, then processing continues to step 495.

Because the typical number of attributes are about or less than 5, an illustration of the roll-up operational steps 400 is useful for five attributes, namely attributes A, B, C, D, and E. Proceeding with this example beginning at step 412, n, and the scratch variable x, are set to equal 5 which is the number of dimensions of a data cube based on the five attributes in the SELECT statement. At step 418, a scoreboard array of $2^5$ bits, that is 32 bits, are set to 0. At step 425, the roll-up string is set to equal the original n attributes of A B C D E.

The first roll-up begins at step 431 on the original n roll-up string A B C D E as set forth in Table 1 below.

TABLE 1

| Roll-up String | Binary Representation | Scoreboard Bit Position |
|---|---|---|
| ABCDE | 00000 | 0 |
| ABCD | 00001 | 1 |
| ABC | 00011 | 3 |
| AB | 00111 | 7 |
| A | 01111 | 15 |
|   | 11111 | 31 |

In a preferred embodiment each roll-up string in Table 1 can be represented by a corresponding binary string of unique bits that contain zeros where an attribute is present in a given roll-up string and a 1 when an attribute is missing from a give roll-up string. These binary representations make it easy to determine the scoreboard bit position in the 32 bit scoreboard array. Thus, the first roll-up of ABCDE, requires six iterations of the steps 431 and 438.

The barrel shift roll-up steps 458–480, are illustrated below in Tables 2–5. The first roll-up on a barrel shifted roll-up string is illustrated in Table 2.

TABLE 2

| Roll-up String | Binary Representation | Scoreboard Bit Position |
|---|---|---|
| BCDE | 10000 | 16 |
| BCD | 10001 | 17 |
| BC | 10011 | 19 |
| B | 10111 | 23 |

Beginning with the original n attributes ABCDE, the first barrel shifted roll-up string identified in step 458, contains BCDE. Note that the binary representation of each of the barrel shifted roll-up strings maintains the original n attribute order. Thus, the binary representation of the barrel shifted roll-up string BCDE would be 10000 indicating a base 10 scoreboard bit position of 16. Note also that for each iteration of the barrel shifted roll-up in Table 2, only the leftmost x attributes are aggregated in the four iterations of step 470 and 473.

The barrel shift sequence repeats at step 453 as illustrated below in Table 3.

TABLE 3

| Roll-up String | Binary Representation | Scoreboard Bit Position |
|---|---|---|
| CDEA | 01000 | 8 |
| CDE | 11000 | 24 |
| CD | 11001 | 25 |
| C | 11011 | 27 |

The second barrel shifted roll-up string contains CDEA which corresponds to the binary representation of 01000 and the base 10 equivalent of scoreboard bit position 8.

The results of the third barrel shift and roll-up sequence is illustrated in Table 4 below.

TABLE 4

| Roll-up String | Binary Representation | Scoreboard Bit Position |
|---|---|---|
| DEAB | 00100 | 4 |
| DEA | 00110 | 12 |
| DE | 11100 | 28 |
| D | 11101 | 29 |

The results of the barrel shift roll-up is illustrated in Table 5 below.

TABLE 5

| Roll-up String | Binary Representation | Scoreboard Bit Position |
|---|---|---|
| EABC | 00010 | 2 |
| EAB | 00110 | 6 |
| EA | 01110 | 14 |
| E | 11110 | 30 |

When the original string of n attributes has been barrel shifted so that the original attribute order is represented once again at decision step 465, then the scoreboard is evaluated to determine if all bits in the scoreboard array have been set from a 0 to 1. Table 6 below illustrates all $2^5$ scoreboard bit positions 0–31 along with the binary attribute representations and the associated values for each bit in the scoreboard array.

TABLE 6

| Binary Representation | Bit Position | Value |
|---|---|---|
| 00000 | 0 | 1 |
| 00001 | 1 | 1 |
| 00010 | 2 | 1 |
| 00011 | 3 | 1 |
| 00100 | 4 | 1 |
| 00101 | 5 | 0 |
| 00110 | 6 | 1 |
| 00111 | 7 | 1 |
| 01000 | 8 | 1 |
| 01001 | 9 | 0 |
| 01010 | 10 | 0 |
| 01011 | 11 | 0 |
| 01100 | 12 | 1 |
| 01101 | 13 | 0 |
| 01110 | 14 | 1 |
| 01111 | 15 | 1 |
| 10000 | 16 | 1 |
| 10001 | 17 | 1 |
| 10010 | 18 | 0 |
| 10011 | 19 | 1 |
| 10100 | 20 | 0 |

TABLE 6-continued

| Binary Representation | Bit Position | Value |
|---|---|---|
| 10101 | 21 | 0 |
| 10110 | 22 | 0 |
| 10111 | 23 | 1 |
| 11000 | 24 | 1 |
| 11001 | 25 | 1 |
| 11010 | 26 | 0 |
| 11011 | 27 | 1 |
| 11100 | 28 | 1 |
| 11101 | 29 | 1 |
| 11110 | 30 | 1 |
| 11111 | 31 | 1 |

In the present example scoreboard bit positions 5, 9–11, 13, 18, 20–22, and 26 have not been set. For this reason the attribute strings associated with each of the above bit positions must be located and aggregated in step 490. The details of step are disclosed in the text accompanying FIG. 5.

FIG. 5 illustrates the operational steps 500 for rolling up the remaining strings identified by the 0 bits in the scoreboard array. Operational steps 500 begin at step 508 and illustrate the details of step 490 from FIG. 4.

At step 512, variable x is set equal to 2 because the attribute string associated with the first and second bit positions 0 and 1 will always have been previously set during the barrel shifting operational steps 400. If at decision step 518 it is determined that scratch variable x is less than the $2^n$ bit scoreboard array size and there is at least one scoreboard bit that is not set, then processing continues at decision step 524. Alternatively, if at decision step 518 it is determined that either scratch variable x is greater than or equal to the $2^n$ bits of the scoreboard array or there are no set bits in the scoreboard array then processing continues at step 521.

If it is determined at 524 that bit position x is set in the scoreboard array, then processing continues at step 580 where scratch variable x is incremented by one and processing continues at decision step 518 as previously disclosed. Alternatively, if it is determined at decision step 524 that bit position x is not set in the scoreboard array, then processing continues at step 528 where the set of attributes associated with the scoreboard bit in position x are identified. The attributes associated with scoreboard bit position x are easily identified from the binary representation of x. In a preferred embodiment, a 1 in any position of the binary representation of x indicates the absence of an attribute in the set of attributes, and a 0 in any position of the binary representation of x indicates the presence of an attribute in the set of attributes.

At step 535, permutations are generated for the set of attributes identified in step 528 and the permutation that will produce the most new roll-up aggregates is saved at step 542. Ordinarily for a set of m attributes, m! permutations can be generated. However, at this stage of the process, a roll-up string of m attributes can produce at most only m-1 new roll-ups. For this reason, once a permutation is encountered that produces m-1 new roll-ups, no more new permutations need be generated at step 535. If more than one permutation has the property of producing m-1 new roll-ups, then the first such permutation encountered is saved at step 542.

At step 547, scratch variable y is set to the number of roll-up string attributes in the identified permutation. At step 556, the present roll-up string is aggregated for the first y attributes in the roll-up string, and the corresponding bit in the scoreboard array is updated at step 563. At step 568, scratch variable y is decremented by one and processing continues at processing step 575. If it is determined at step 575 that y is greater than 1, then processing continues at step 556 as previously disclosed. Alternatively, if it is determined at step 575 that y is less than or equal 1, then processing continues at step 580 where scratch variable x is decremented by one and processing continues at decision step 518 as previously disclosed.

To continue the illustrative example developed in Tables 1–6 above, the operational steps 500 will first encounter scoreboard array bit position 5 at decision step 524, as a bit position that does not contain a 1.

Table 7 illustrates the binary representation associated with bit position 5 and the attributes that the binary representation represents.

TABLE 7

| Bit Position | Binary Representation | Attributes |
|---|---|---|
| 5 | 00101 | A,B,D |

The binary representation of attributes at scoreboard array bit position 5, as illustrated in Table 7, not only quickly identifies the scoreboard bit position but also quickly identifies which of the attributes A, B, and D, that have not been previously rolled up. However, at step 535, the various permutations of the attribute string associated with scoreboard array x, must be evaluated to determine the permutation that will produce the most roll-ups. Table 8 below illustrates two possible permutations of the string ABD.

TABLE 8

| Permutation | Roll-ups |
|---|---|
| ABD | 1 |
| ADB | 2 (maximum possible) |

Step 542 sets the roll-up string to the permutation ADB because the string will produce m−1=2 new roll-up aggregates at scoreboard positions 5 and 13 as illustrated in Table 9.

TABLE 9

| Roll-up String | Binary Representation | Scoreboard Bit Position |
|---|---|---|
| ADB | 00101 | 5 |
| AD | 01101 | 13 |

At step 558, the first y roll-up string attributes of the string ADB, are aggregated and the corresponding scoreboard array bit updated at step 563. None of the individual attributes A, B, C, D, or E need be individually aggregated because the operational steps 400 guarantee that they have been previously aggregated.

Following the roll-up of the first permutation attribute set, processing continues at step 518 where the next scoreboard array bit position 9 is identified at decision step 524 as not being set as shown in Table 10.

TABLE 10

| Bit Position | Binary Representation | Attributes |
|---|---|---|
| 9 | 01001 | A,C,D |

Permutations of ACD identified at step 535 include only ACD. The ACD permutation yields the maximum number of m−1 unaggregated possibilities as illustrated in Tables 11 and 12 below.

TABLE 11

| Permutation | Roll-ups |
|---|---|
| ACD | 2 (maximum possible) |

TABLE 12

| Roll-up String | Binary Representation | Scoreboard Bit Position |
|---|---|---|
| ACD | 01001 | 9 |
| AC | 01011 | 11 |

Tables 13–15 illustrate the next series of roll-ups after having identified scoreboard bit position 10 as not having been set in decision step 524.

TABLE 13

| Bit Position | Binary Representation | Attributes |
|---|---|---|
| 10 | 01010 | A,C,E |

The generated permutations of the string ACE and the corresponding number of possible roll-ups are illustrated in Table 14.

TABLE 14

| Permutation | Roll-ups |
|---|---|
| ACE | 1 |
| AEC | 1 |
| CAE | 1 |
| CEA | 2 (maximum possible) |

The new roll-ups and the scoreboard bit positions that are updated corresponding to each roll-up string is illustrated in Table 15.

TABLE 15

| Roll-up String | Binary Representation | Scoreboard Bit Position |
|---|---|---|
| CEA | 01010 | 10 |
| CE | 11010 | 26 |

Tables 16–18 illustrate the next series of roll-ups after having identified scoreboard bit position 18 as not having been set.

TABLE 16

| Bit Position | Binary Representation | Attributes |
|---|---|---|
| 18 | 10010 | B,C,E |

The generated permutations of the string BCE and the corresponding number of possible roll-ups are illustrated in Table 17.

TABLE 17

| Permutation | Roll-ups |
|---|---|
| BCE | 1 |
| BEC | 2 |
|  | (maximum possible) |

The new roll-ups and the scoreboard bit positions that are updated are illustrated in Table 18.

TABLE 18

| Roll-up String | Binary Representation | Scoreboard Bit Position |
|---|---|---|
| BEC | 10010 | 18 |
| BE | 10110 | 22 |

Tables 19–21 illustrate the final series of roll-ups after having identified scoreboard bit position 20 as not having been set.

TABLE 19

| Bit Position | Binary Representation | Attributes |
|---|---|---|
| 20 | 10100 | B,D,E |

The possible roll-up permutations on a string BDE is determined as illustrated in Table 20.

TABLE 20

| Permutation | Roll-ups |
|---|---|
| BDE | 2 |
|  | (maximum possible) |

The new roll-ups and the corresponding scoreboard bit positions that are updated in Table 21.

TABLE 21

| Roll-up String | Binary Representation | Scoreboard Bit Position |
|---|---|---|
| BDE | 10100 | 20 |
| BD | 10101 | 21 |

Table 22 illustrates benchmark results of the numbers of roll-ups required for n-dimensional arrays. The Optimal column is the theoretically optimal number of roll-ups required each dimension. The Present Invention column illustrates the actual number of roll-ups resulting by using the techniques of the present invention. The Present Invention numbers of roll-ups are matched one-for-one with or less than 5% of the Optimal number of roll-ups, yet the implementation of the present invention is less complex and less processing intensive than Optimal implementations.

TABLE 22

| Data Cube on N Dimensions | | |
|---|---|---|
| N Dimensions | Optimal | Present Invention |
| 1 | 1 | 1 |
| 2 | 2 | 2 |
| 3 | 3 | 3 |
| 4 | 6 | 6 |
| 5 | 10 | 10 |
| 6 | 20 | 20 |
| 7 | 35 | 37 |
| 8 | 70 | 71 |
| 9 | 126 | 129 |
| 10 | 252 | 252 |
| 11 | 462 | 478 |
| 12 | 924 | 926 |
| 13 | 1716 | 1784 |

FIG. 6 illustrates the super-aggregate operational steps 600 for generating super-aggregates from the roll-up process disclosed in FIGS. 4–5. The super-aggregate operational steps 600 are the details of step 342 from the FIG. 3 overview.

The super-aggregate operational steps 600 begin at step 608 and proceed to step 615 where the aggregate function being applied is classified so that the most efficient processing technique can be applied. Aggregation functions can be classified into three categories: distributive, algebraic and holistic. Each of the three categories can be further defined by considering the aggregation of a two dimensional set of values $\{Xij\backslash I-1, \ldots, I; j=1, \ldots, J\}$.

An aggregate function F() is distributive if there is a function G() such that $F(\{Xi,j\})=G(\{F(\{Xi,j\backslash I=1, \ldots, I\})\backslash j=1, \ldots, J\})$. Aggregate functions including, but not limited to, COUNT(), MIN(), MAX(), and SUM() are common distributive functions. In fact, F=G for all but COUNT() where G=SUM() for the COUNT() function. Once order is imposed on the values, cumulative aggregate functions also fit into the distributive category.

An aggregate function F() is algebraic if there is an M-tuple valued function G() and a function H() such that $F(\{Xi,j\})=H(\{G\{Xi,j\backslash I-1, \ldots, I\})\backslash j=1, \ldots, J\})$. Aggregate functions including, but not limited to, Average(), Standard Deviation, MaxN(), MinN(), and Center_of_mass(), are common algebraic functions. For Average, the function GO records the sum and count of the subset. The H() function adds these two components and then divides to produce the global average. Similar techniques apply to finding the N largest values, the center of mass of a group of objects, and other algebraic functions. The key to algebraic functions is that a fixed size result such as an M-tuple, can summarize the sub-aggregation.

An aggregate function F() is holistic if there is no constant bound on the size of the storage needed to describe a sub-aggregate. That is, there is no constant M, such that an M-tuple characterizes the computation $F(\{Xi,j\backslash I=1, \ldots, I\})$. Aggregate functions including, but not limited to, Median(), MostFrequent() or Mode(), and Rank(), are common holistic functions.

Once at step 615 a classification is determined for the aggregate function being applied, different aggregation techniques are used to minimize the number of function calls required to complete the super-aggregates. If it is determined at decision step 625 that the aggregate function being applied is a holistic function, then processing continues at step 628 where the most efficient technique is to call the Iter(handle, value) function $2^n$ times, that is, once for each super-aggregate using standard GROUP BY techniques. To use the Iter(handle, value) function, a handle must be allocated for each cell in the data cube. A handle is a temporary variable or place-holder that facilitates access to an intermediate result of an otherwise separate operation. Such as for example, an average of a set of values, where each of the values is the sum of at least two numbers, requires a handle for each of the values in the set of values so that all of the values can be counted and summed when it is time to generate the average. Absent the handles, the intermediate results that are the individual values would not be as readily available to generate the average. When a new tuple $(x_1, x_2, \ldots x_n, v)$ arrives, the Iter(handle, value) is called for each handle of each cell of the data cube that matches the value. The $2^n$ comes from the fact that each coordinate can either be $x_i$ or ALL. When all the input tuples have been computed, the controlling system invokes the final(&handle) function for each of the $\Pi(C_i+1)$ nodes in the data cube. Alternatively, if it is determined at decision step 625 that the aggregate function being applied is not a holistic function, the processing continues at decision step 638.

If it is determined at decision step 638 that the aggregate function being applied is a distributive function, then processing continues at step 645 where super-aggregates are generated for the data cube using distributive functions. Because the core of a data cube is represented as an n-dimensional array in memory where each dimension has a size $C_i+1$, the n−1 dimensional slabs of the array are computed by aggregating one dimension of the core. For example, the following computation aggregates the first dimension of the array: CUBE(ALL, $x_2, \ldots, x_n$)=F({CUBE (1, $x_2, \ldots, x_n$)\l=1, \ldots $C_1$}). N such computations will compute the n−1 dimensional super-aggregates. The distributive nature of the function F() allows aggregates to be aggregated. The process can continue to aggregate lower dimensions of the array. For example, in terms of a cross tab, there exists a choice of computing the final super-aggregate by aggregating either the lower row as in F(ALL, *) or by aggregating the right column F(*, ALL). Either approach will generate the same super-aggregate, however, the most efficient choice is to aggregate the row or the column with the fewest $C_i$ to aggregate. Thus, the super-aggregates can be computed by dropping one dimension at a time. Alternatively, if it is determined at decision step 638 that the aggregate function being applied is not a distributive function, the processing continues at decision step 650.

If it is determined at decision step 650 that the aggregate function being applied is an algebraic function, then processing continues at step 658. Algebraic aggregates are difficult to generate because an intermediate computational value is saved in a handle prior to generating the final result in a separate computation. For example, the Average() function maintains the count and sum values in its handle until the final count and sum are available. Thus, the algebraic functions must maintain a handle for each element of the cube so that the final subaggregates are available to generate the super-aggregate. When the core GROUP BY operation is complete, the CUBE operator passes the set of handles for each n−1 dimensional super-aggregate. The handles of the super-aggregates are then passed to the super-super-aggregates and so on until the (ALL, ALL, . . . ,ALL) aggregate has been computed. This passing of the handles is done by a Iter_super(&handle, &handle) function that folds sub-aggregate results into super-aggregates. The Iter_super() function has not previously been disclosed or claimed prior to the present documentation. Alternatively, if it is determined at decision step 650 that the aggregate function being applied is not an algebraic function, then the processing is complete at step 660.

The Iter_super() function is also useful in computing aggregates for parallel database systems. In parallel database systems, the aggregates are computed for each partition of a database in parallel prior to combining the results of the parallel computations. Thus, the Iter_super() function is useful to fold the result of a first computation into the input of successive computations.

Another special data cube processing situation occurs if an entire data cube does not fit into concurrent memory. Because traditional array processing techniques will not work with a data cube that does not fit into memory, the cube can either be partitioned with a hash function or sorted. Both the hash function and the sort are standard techniques available with the GROUP BY clause. Because the numbers of super-aggregates are typically orders of magnitude smaller than the core of the data cube, the super-aggregates will typically fit into memory. Sorting is the preferred partition technique because the roll-up process phase of computing a data cube requires that the results set sorted anyway.

Summary

The efficient implementation of a multidimensional aggregation operator generates a data cube containing a set of sub-aggregates from a roll-up and barrel shift technique that is tracked by a scoreboard array, and a set of at least one super-aggregate from an efficient aggregate function application that is applied as determined by the aggregate function type. Although specific embodiments are disclosed herein, it is expected that persons skilled in the art can and will design alternative multidimensional aggregation operators that are within the scope of the following claims either literally or under the Doctrine of Equivalents.

What is claimed is:

1. A computer readable medium containing computer executable instructions to perform a method for generating a data cube from a results set of a database query, said method comprising:

identifying a roll-up string of attributes from said results set;

generating at least one aggregate from said roll-up string by way of a minimum union of roll-up operator calls based on a barrel shift of said roll-up string;

saving said at least one aggregate in said data cube; and generating at least one super-aggregate from said at least one aggregate by way of a minimum number of aggregation function calls dictated by an aggregation function classification selected from a group of aggregation categories consisting of: distributive, algebraic, and holistic.

2. A method according to claim 1 wherein said step of generating at least one aggregate includes:

executing a roll-up operation on said roll-up string;

executing said barrel shift of said roll-up string; and executing a roll-up operation on said barrel shift of said roll-up string.

3. A method according to claim 2 including:

maintaining a scoreboard array of one scoreboard bit entry for each roll-up aggregate on said roll-up string;

examining said scoreboard array to determine when a complete set of said at least one aggregate exists; and executing a roll-up operation on an attribute string associated with each unset scoreboard bit entry.

4. A method according to claim 3 including:

translating a base 10 scoreboard bit entry position in said scoreboard array to a base 2 equivalent; and identifying said attribute string associated with said base 10 scoreboard bit entry position by way of said base 2 equivalent wherein a first binary value indicates a presence of an attribute in said attribute string and a second binary setting opposite said first binary value indicates an absence of an attribute in said attribute string.

5. A computer-readable storage device containing instructions for controlling a computer system to perform the steps of claim 4.

6. A method according to claim 1 wherein said step of generating at least one super-aggregate includes:

identifying an aggregate function as an algebraic aggregate function;

assigning a handle to each value presently in said data cube; and executing at least one iteration of said algebraic aggregate function to fold each of said at least one sub-aggregate into at least one super-aggregate.

7. A computer readable medium containing computer executable instructions to perform a method for generating a data cube from a results set of a database query, said method comprising:

generating at least one aggregate from said results set by way of a minimum union of roll-up operator calls on a barrel shift of an attribute set;

saving said at least one aggregate in said data cube; and categorizing an applicable aggregation function according to a group of aggregation categories consisting of: distributive, algebraic, and holistic;

assigning a handle to each value presently in said data cube that is subject to aggregation by an algebraic aggregation function; and generating at least one super-aggregate from said at least one sub-aggregate by way of a minimum number of aggregation function calls dictated by said aggregation function category.

8. A computer-readable storage device containing instructions for controlling a computer system to perform the steps of claim 7.

9. A method according to claim 7 wherein said step of generating at least one aggregate includes:

executing a roll-up operation on said attribute set from said results set;

executing said barrel shift of said attribute set; and executing a roll-up operation on said barrel shift of said attribute set.

10. A method according to claim 9 including:

maintaining a scoreboard array of one scoreboard bit entry for each roll-up aggregate on said attribute set;

examining said scoreboard array to determine when a complete set of said at least one aggregate exists; and executing a roll-up operation on an attribute string associated with each unset scoreboard bit entry.

11. A method according to claim 7 wherein said step of generating at least one super-aggregate includes:

executing, in response to said aggregate function being a said algebraic aggregate function, at least one iteration of said algebraic aggregate function to fold each of said at least one sub-aggregate into at least one super-aggregate.

12. A computer readable medium containing computer executable instructions to perform a method comprising:

determine a minimum plurality of aggregate operations required for n attributes of an n-dimensional results set;

executing said minimum plurality of aggregate operations in a manner comprising;

executing an aggregate roll-up operation on said n attributes;

repeatedly generating a unique barrel shift sub-set string of said n attributes and executing said aggregate roll-up operation on said unique barrel shift sub-set string until no unique barrel shift set string of said n attributes exists;

tracking completed aggregations of said aggregate roll-up operation in a scoreboard array;

examining said scoreboard array to verify that a complete set of aggregates exists;

executing a roll-up operation on an attribute string associated with each unset entry in said scoreboard array; and generating at least one super-aggregate from said complete set of sub-aggregates dictated by at least one aggregate function selected from a group of aggregate function categories consisting of: distributive, algebraic, and holistic.

13. A method according to claim 12 wherein said step of generating at least one super-aggregate includes:

identifying an aggregate function as an algebraic aggregate function;

assigning a handle to each value presently in said data cube; and executing at least one iteration of said algebraic aggregate function to fold each of said at least one sub-aggregate into at least one super-aggregate.

14. A computer-readable storage device containing instructions for controlling a computer system to perform the steps of claim 13.

* * * * *

UNITED STATES PATENT AND TRADEMARK OFFICE
CERTIFICATE OF CORRECTION

PATENT NO.  : 5,822,751

DATED       : October 13, 1998

INVENTOR(S) : Jim Gray; Donald C. Reichart

It is certified that error appears in the above-identified patent and that said Letters Patent is hereby corrected as shown below:

Replace occurrences of "lter_super" with --Iter_super-- including at Abstract, Line 18; Column 2, Line 48; Column 2, Line 52; Column 13, Line 61; Column 13, Line 63; Column 14, Line 1; Column 14, Line 5

Column 4, Line 26, replace "super-superaggregate" with --super-super-aggregate--

Column 5, Line 43, replace "(n-1)2" with --$(n-1)^2$--

Column 6, Line 61, replace bold "10" with non-bold --10--

Column 7, Line 13, replace bold "10" with non-bold --10--

Column 7, Line 13, replace bold "8" with non-bold --8--

Column 7, Line 43, replace bold "0-31" with non-bold --0-31--

Column 8, Line 16, replace bold "5, 9-11" with non-bold --5, 9-11--

Column 8, Line 17, replace bold "13, 18, 20-22 and 26" with non-bold --13, 18, 20-22 and 26--

Column 8, Line 27, replace bold "0 and 1" with non-bold --0 and 1--

Column 8, Line 57, replace bold "1" and non-bold --1--

Column 8, Line 59, replace bold "1" and non-bold --1--

UNITED STATES PATENT AND TRADEMARK OFFICE
CERTIFICATE OF CORRECTION

PATENT NO.   : 5,822,751

DATED        : October 13, 1998

INVENTOR(S)  : Jim Gray; Donald C. Reichart

It is certified that error appears in the above-identified patent and that said Letters Patent is hereby corrected as shown below:

```
Column 9, Line 16, replace bold "5" with non-bold --5--

Column 9, Line 27, replace bold "5" with non-bold --5--

Column 9, Line 46, replace bold "5 and 13" with non-bold
--5 and 13--

Column 9, Line 66, replace bold "9" with non-bold --9--

Column 10, Line 30, replace bold "10" with non-bold --10--

Column 10, Line 66, replace bold "18" with non-bold --18--

Column 11, Line 65, replace "5%" with --5% off--

Column 12, Line 30, replace "\" with --|--

Column 12, Line 32, replace "\" with --|--

Column 12, Line 33, replace "\" with --|--

Column 12, Line 41, replace two occurrences of "\" with --|--

Column 12, Line 44, replace "GO" with --G()--

Column 12, Line 55, replace "\" with --|--
```

UNITED STATES PATENT AND TRADEMARK OFFICE
CERTIFICATE OF CORRECTION

PATENT NO. : 5,822,751

DATED : October 13, 1998

INVENTOR(S) : Jim Gray; Donald C. Reichart

Page 3 of 3

It is certified that error appears in the above-identified patent and that said Letters Patent is hereby corrected as shown below:

Column 12, Line 66, replace "lter(handle, value)" with --Iter(handle, value)--

Column 13, Line 1, replace "lter(handle, value)" with --Iter(handle, value)--

Column 13, Line 12, replace "lter(handle, value)" with --Iter(handle, value)--

Column 13, Line 30 replace "\" with --|--

Column 13, Line 54, replace "subaggregates" with --sub-aggregates--

Column 14, Line 51, replace "I" with --1--

Column 16, Line 32, is a continuation of Line 31

Signed and Sealed this

Twenty-seventh Day of April, 1999

*Attest:*

*Attesting Officer*

Q. TODD DICKINSON

*Acting Commissioner of Patents and Trademarks*